3,556,641
Patented Jan. 19, 1971

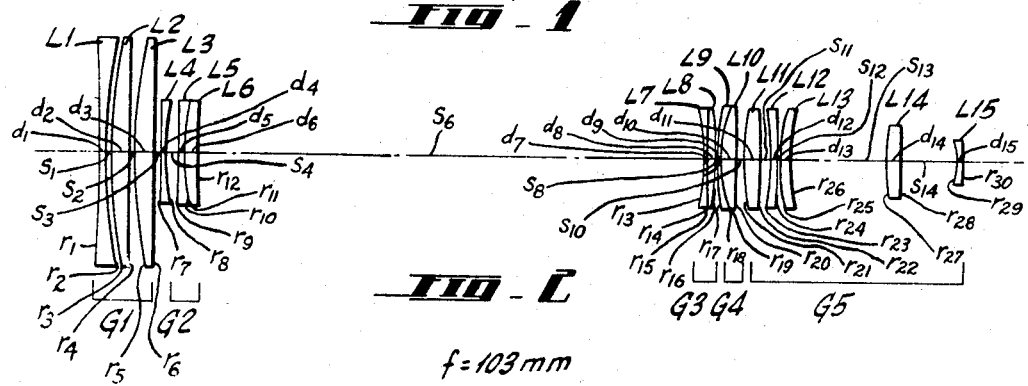

3,556,641
ZOOM LENS SYSTEM HIGHLY CORRECTED FOR COMA ABERRATION
Yasuo Takahashi, Tokyo-to, Japan, assignor to Asahi Kogaku Kogyo Kabushiki Kaisha, Tokyo-to, Japan, a corporation of Japan
Filed June 26, 1967, Ser. No. 648,910
Claims priority, application Japan, June 30, 1966, 41/42,820
Int. Cl. G02b *15/14, 9/60*
U.S. Cl. 350—184                                                1 Claim

ABSTRACT OF THE DISCLOSURE

A zoom lens includes fifteen lenses defining five lens groups including respectively the first to the third lenses, the fourth to the sixth lens, the eighth and ninth lens, the tenth and eleventh lens, and the twelfth to the fifteenth lens, and satisfy the following conditions:

$$0.7 < r_2/r_3 < 1.1$$
$$F_1/0.4 < |f1.2| < \infty$$
$$1.6 \leq n_3 \leq 1.75$$
$$0.5F_1 \leq |r_7| \leq 4F_1 \quad r_7 < 0$$
$$F_1 \geq F_4 \geq 0.5F_1$$
$$0.05F_1 \leq r_{18} \leq 0.3F_1$$
$$0.03F_1 \leq |r_{29}| \leq 0.13F_1 \quad r_{29} < 0$$

wherein $r_2$, $r_3$, $r_7$, $r_{18}$, and $r_{29}$ are the radii of the curvature of the first lens rear face, the second lens front face, the fourth lens front face, the tenth lens front face and the fifteenth lens fron face respectively: $F_1$ and $F_4$ are resultant focal lengths respectively of the first through the third lenses, and the ninth and tenth lenses; $f_{1.2}$ is the resultant focal length of the first and second lenses, and $n_3$ is the index of refraction of the third lens.

BACKGROUND OF THE INVENTION

The present invention relates generally to improvement in lens systems and it relates particularly to an improved zoom lens system of long focal length which is highly corrected for coma aberration.

With recent advances in zoom lens technique and design there has appeared a growing demand for zoom lenses of high zoom ratio, and highly corrected zoom lenses for still cameras have long been desired and sought after. However, the long focal length zoom lenses, particularly for still cameras, which are now available or which have been heretofore proposed possess many drawbacks and disadvantages particularly in their overall optical performance over a large range of effective focal lengths. While in zoom lenses of long focal length the decreased viewing angle results in a facilitated design there is an increased aggravation of chromatic aberration which has presented an important problem.

SUMMARY OF THE INVENTION

A principal object of the present invention is to provide an improved zoom lens.

Another object of the present invention is to provide an improved zoom lens of long focal and high zoom ratio.

Still another object of the present invention is to provide an improved long focal lens high zoom ratio zoom lens system of highly corrected coma aberration.

A further object of the present invention is to provide a highly corrected long focal length zoom lens of high zoom ratio and possessing great optical efficiency over its full range of adjustment.

The above and other objects of the present invention will become apparent from a reading of the following description taken in conjunction with the accompanying drawing which illustrates a preferred embodiment thereof.

In a sense the present invention contemplates the provision of a lens system comprising fifteen lenses consecutively designated as the first to the fifteenth lens and defining five lens groups consecutively designated as the first to the fifth lens group and including respectively the first to the third lens, the fourth to the sixth lens, the seventh and eighth lenses, the ninth and tenth lenses, and the eleventh to the fifteenth lens and satisfying the following conditions:

(1) $\quad 0.7 < r_2/r_3 < 1.1$
(2) $\quad F_1/0.4 < |/f1.2| < \infty$
(3) $\quad 1.6 \leq n_3 \leq 1.75$
(4) $\quad 0.5F_1 \leq |r_7| \leq 4F_1 \quad r_7 < 0$
(5) $\quad F_1 \geq F_4 \geq 0.5F_1$
(6) $\quad 0.05F_1 \leq r_{18} \leq 0.3F_1$
(7) $\quad 0.03F_1 \leq |r_{29}| \leq 0.13F_1 \quad r_{29} < 0$ The first lens group includes one negative lens and two positive lenses, the resultant type being positive; the second lens group includes two negative lenses and one positive lens, the resultant type being negative; the third lens group includes one negative lens and one positive lens, the resultant type being negative; the lens fourth group comprises one negative lens and one positive lens, the resultant type being positive; and the fifth lens group comprises three positive lenses and two negative lenses, the resultant type being positive.

The lenses are axially mounted in a barrel in the manner conventional with zoom lenses, the first and second lens groups being oppositely axially simultaneously movable in a predetermined mutual relationship by well known adjusting means, the movement of the first lens group being relatively small as compared to the movement of the second group, such movements effecting a variation in the resultant focal length of the overall lens system to increase or decrease such focal length as desired. The third lens group is likewise axially movable to maintain the focus of the lens system at a fixed point. The first, fourth and fifth lens groups are of the positive type and the second and third lens groups are of the negative type. The first, fourth, fifth, seventh, ninth, twelfth and fifteenth lenses are negative and the second, third, sixth, eighth, tenth, eleventh, thirteenth and fourteenth lenses are positive.

Considering the conditions enumerated above, condition (1) is effective in suitably balancing spherical aberration in the long focal length range of the lens system and also prevents aggravation of coma aberration with respect to positive incident light rays and light rays of high incident points. The effects of conditions (2) and (3) are similar to those of condition (1). Condition (4) serves to prevent aggravation of coma aberration which may occur in the short focal length range of the lens system and in addition contributes to a distortion aberration balance over the full focal length range of the lens system. Condition (5) is required for maintaining the focus of the lens system at a fixed position and also serves to prevent excessive lens movement. Condition (6) in cooperation with conditions (1), (2), (3) and (4), prevents aggravation of coma aberration in the short focal length range of the lens system. Condition (7) prevents aggravation of coma aberration with respect to positive incident light rays and light rays of low incident points.

Under the above conditions, in accordance with the present invention, a suitable correction of chromatic aberration effects an excellent balance of coma and other aberrations, and thus the aggravation of chromatic aberration which becomes conspicuous as the focal length is increased, is prevented in a highly efficient manner.

BRIEF DESCRIPTION OF THE DRAWINGS

FIG. 1 is a longitudinal sectional view of a lens system embodying the present invention; and FIG. 2 are sets of curves of the spherical aberration, distortion and astigmatism of the lens system at focal lengths of 103 mm. and 584 mm. respectively.

DESCRIPTION OF THE PREFERRED EMBODIMENTS

Referring now to the drawings and particularly FIG. 1 thereof which illustrates a preferred embodiment of the present invention, the improved lens system comprises fifteen coaxially positioned lenses designated successively as lenses L1 to L15 respectively and divided into five successive lens groups designated successively as G1 to G5 respectively.

The first lens group G1 is positive and includes the lenses L1, L2 and L3, lens L1 being negative and having a thickness $d_1$, a refractive index $n_1$, a front face of radius of curvature $r_1$ and a rear face of radius $r_2$; lens L2 being positive and spaced from lens L1 a distance $S_1$ and having a thickness $d_2$, a refractive index $n_2$, a front face of radius $r_3$ and a rear face of radius $r_4$; and lens L3 being positive and spaced from lens L2 a distance $S_2$ and having a thickness $d_3$, a refractive index $n_3$, a front face of radius $r_5$ and a rear face of radius $r_6$.

The second lens group G2 is negative and includes lenses L4, L5 and L6, lens L4 being negative and spaced from lens L3 a variable distance $s_3$ and having a thickness $d_4$, a refractive index $n_4$, a front face of radius $r_7$ and a rear face of radius $r_8$; lens L5 being negative and spaced from lens L4 a distance $s_4$ and having a thickness $d_5$, a refractive index $n_5$ a front face of radius $r_9$ and a rear face of radius $r_{10}$; and L6 being positive with a front face of radius $r_{11}$ complementing and in mating engagement with the rear face of lens L5, and having a thickness $d_6$, a refractive index $n_6$ and a rear face of radius $r_{12}$.

The third lens group G3 is negative and includes lenses L7 and L8, lens L7 being negative and spaced from lens L6 a variable distance $s_6$ and having a thickness $d_7$, a refractive index $n_7$, a front face of radius $r_{13}$, and a rear face of radius $r_{14}$; and lens L8 being positive with a front face of radius $r_{15}$ complementing and in mating engagement with the rear face of lens L7 and having a thickness $d_8$, a refractive index $n_8$ and a rear face of radius $r_{16}$.

The fourth lens group G4 is positive and includes leneses L9 and L10, lens L9 being negative and spaced from lens L8 a variable distance $s_8$ and having a thickness $d_9$, a refractive index $n_9$, a front face of radius $r_{17}$ and a rear face of radius $r_{18}$; a lens L10 being positive with a front face of radius $r_{19}$ complementing and in mating engagement with the rear face of lens L9 and having a thickness $d_{10}$, a refractive index $n_{10}$ and a rear face of radius $r_{20}$.

The fifth lens group G5 is positive and includes lenses L11, L12, L13, L14 and L15, lens L11 being positive and spaced from lens L10 a distance $S_{10}$ and having a thickness $d_{11}$, a refractive index $n_{11}$, a front face of radius $r_{21}$ and a rear face of radius $r_{22}$; lens L12 being negative and spaced from lens L11 a distance $S_{11}$ and having a thickness $d_{12}$, a refractive index $n_{12}$, a front face of radius $r_{23}$ and a rear face of radius $r_{24}$; lens L13 being positive and spaced from lens L12 a distance $S_{12}$ and having a thickness $d_{13}$, a refractive index $n_{13}$, a front face of radius $r_{25}$ and a rear face of radius $r_{26}$; lens L14 being positive and spaced from lens L13 a distance $S_{13}$ and having a thickness $d_{14}$, a refractive index $n_{14}$, a front face of radius $r_{27}$ and a rear face of radius $r_{28}$, and lens L15 being negative and spaced from lens L14 a distance $S_{14}$ and having a thickness $d_{15}$, a refractive index $n_{15}$, a front face of radius $r_{29}$ and a rear face of radius $r_{30}$.

It should be noted that the lens spacings are measured axially between the confronting faces of the correspondingly spaced lenses. The lens groups G1, G2 and G3 are axially movable in the manner described above. The dimensions, relationships and parameters of the lenses are such as to satisfy the conditions previously set forth.

The following Table I sets forth the dimensions and parameters of a specific example of the present lens system. Tables II and III set forth the Seidel coefficients of the lens system adjusted for focal lengths of 103.298 millimeters and 584.163 millimeters respectively.

TABLE I

Lens data

| | | |
|---|---|---|
| $r_1 = -2,037.300$ | $d_1 = 3.00$ | $n_1 = 1.67270/32.2$ |
| $r_2 = 302.678$ | $S_1 = 3.00$ | |
| $r_3 = 344.587$ | $d_2 = 12.00$ | $n_2 = 1.62299/58.1$ |
| $r_4 = -1,503.486$ | $S_2 = 0.50$ | |
| $r_5 = 306.000$ | $d_3 = 10.00$ | $n_3 = 1.65830/53.4$ |
| $r_6 = -5,125.200$ | $S_3 = 5.00$-$294.14$ | |
| $r_7 = -571.572$ | $d_4 = 2.50$ | $n_4 = 1.62041/60.3$ |
| $r_8 = 143.440$ | $S_4 = 7.00$ | |
| $r_9 = -5,994.375$ | $d_5 = 2.50$ | $n_5 = 1.60311/60.7$ |
| $r_{10}, r_{11} = 111.400$ | $d_6 = 8.00$ | $n_6 = 1.76182/26.5$ |
| $r_{12} = 387.539$ | | |
| $r_{13} = -120.170$ | $S_6 = 270.00$-$5.94$ | |
| $r_{14}, r_{15} = 485.000$ | $d_7 = 2.00$ | $n_7 = 1.67000/51.7$ |
| $r_{16} = -249.500$ | $d_8 = 5.00$ | $n_8 = 1.67270/32.2$ |
| $r_{17} = 196.875$ | $S_8 = 0.50$-$30.98$ | |
| $r_{18}, r_{19} = 73.840$ | $d_9 = 2.00$ | $n_9 = 1.62045/38.0$ |
| $r_{20} = -496.238$ | $d_{10} = 7.00$ | $n_{10} = 1.64000/60.2$ |
| $r_{21} = 139.650$ | $S_{10} = 5.00$ | |
| $r_{22} = -340.800$ | $d_{11} = 9.00$ | $n_{11} = 1.60311/60.7$ |
| $r_{23} = -225.000$ | $S_{11} = 4.00$ | |
| $r_{24} = 314.147$ | $d_{12} = 4.24$ | $n_{12} = 1.72825./28.3$ |
| $r_{25} = 66.838$ | $S_{12} = 0.51$ | |
| $r_{26} = 111.400$ | $d_{13} = 8.00$ | $n_{13} = 1.51633/64.1$ |
| $r_{27} = 105.524$ | $S_{13} = 51.18$ | |
| $r_{28} = 485.000$ | $d_{14} = 7.00$ | $n_{14} = 1.58267/46.5$ |
| $r_{29} = -44.200$ | $S_{14} = 28.15$ | |
| $r_{30} = -98.849$ | $d_{15} = 2.56$ | $n_{15} = 1.51633/64.1$ |

TABLE II.—SEIDEL COEFFICIENTS
[f=103.298; EP=158]

| | $S_1$ | $S_2$ | $S_3$ | P | $S_5$ |
|---|---|---|---|---|---|
| 1 | -0.000 | 0.000 | -0.014 | -0.020 | 0.734 |
| 2 | 0.092 | 0.012 | 0.005 | 0.137 | -0.031 |
| 3 | 0.075 | 0.019 | 0.005 | 0.115 | 0.031 |
| 4 | -0.000 | 0.000 | -00.03 | 0.026 | -0.625 |
| 5 | 0.014 | 0.017 | 0.021 | 0.134 | 0.189 |
| 6 | 0.007 | -0.040 | 0.232 | 0.008 | -1.385 |
| 7 | -0.025 | 0.098 | -0.386 | -0.069 | 1.786 |
| 8 | -0.428 | -0.147 | -0.050 | -0.275 | 0.112 |
| 9 | 0.005 | 0.023 | 0.104 | -0.065 | 0.176 |
| 10 | 0.313 | -0.224 | 0.160 | 0.052 | -0.152 |
| 11 | -0.268 | -0.014 | -0.000 | -0.115 | -0.006 |
| 12 | -0.899 | 0.344 | -0.132 | -0.344 | 0.182 |
| 13 | 0.048 | 0.002 | 0.000 | 0.000 | 0.000 |
| 14 | -0.042 | -0.091 | -0.195 | 0.166 | -0.061 |
| 15 | 15.958 | 1.000 | 0.062 | 0.20 | 0.016 |
| 16 | 2.529 | -0.078 | 0.002 | 0.010 | -0.000 |
| 17 | 0.080 | -0.070 | 0.061 | 0.081 | -0.125 |
| 18 | 3.583 | 0.487 | 0.066 | 0.278 | 0.046 |
| 19 | 14.057 | -3.601 | 0.922 | 0.114 | -0.265 |
| 20 | -21.108 | 4.840 | -1.110 | -0.193 | 0.298 |
| 21 | -0.042 | -0.028 | -0.019 | -0.138 | -0.108 |
| 22 | 19.104 | 1.188 | 0.073 | 0.526 | .037 |
| 23 | 0.252 | 0.091 | 0.033 | -0.315 | -0.102 |
| 24 | -0.176 | -0.156 | -0.138 | 0.360 | 0.196 |
| 25 | 3.352 | -1.116 | 0.371 | -0.097 | -0.097 |
| 26 | -38.659 | -1.568 | -0.063 | -0.795 | -0.034 |
| 27 | 4.748 | 0.698 | 0.102 | 0.365 | -0.066 |
| SUM | 2.424 | 0.560 | 0.105 | -0.120 | 0.758 |

TABLE III.—SEIDEL COEFFICIENTS
[f=584.163; EP=1203]

| | $S_1$ | $S_2$ | $S_3$ | P | $S_5$ |
|---|---|---|---|---|---|
| 1 | -0.005 | 0.031 | -0.174 | -0.115 | 1.607 |
| 2 | -16.684 | 29.458 | -52.012 | -0.776 | 93.207 |
| 3 | 13.739 | -23.944 | 41.728 | 0.650 | -73.853 |
| 4 | -0.000 | 0.005 | -0.040 | 0.149 | -0.730 |
| 5 | 2.630 | -4.139 | 6.513 | 0.757 | -11.440 |
| 6 | 1.268 | -3.562 | 10.000 | 0.045 | -23.201 |
| 7 | -0.864 | 2.016 | -4.705 | -0.391 | 11.892 |
| 8 | -0.654 | -0.349 | -0.186 | -1.559 | -0.930 |
| 9 | -0.000 | 0.003 | -0.033 | -0.369 | 3.904 |
| 10 | 0.850 | -0.079 | 0.007 | 0.294 | -0.028 |
| 11 | -0.270 | -0.390 | -0.562 | -0.651 | -1.750 |
| 12 | -0.158 | 0.344 | -0.744 | -1.950 | 5.843 |
| 13 | 0.008 | 0.002 | 0.000 | 0.001 | 0.000 |
| 14 | -0.007 | -0.091 | -1.104 | 0.941 | -1.960 |
| 15 | 2.821 | 1.000 | 0.354 | 1.136 | 0.528 |
| 16 | 0.447 | -0.078 | 0.013 | 0.058 | -0.012 |
| 17 | 0.014 | -0.070 | 0.349 | 0.459 | -3.999 |
| 18 | 0.633 | 0.487 | 0.375 | 1.573 | 1.500 |
| 19 | 2.485 | -3.601 | 5.219 | 0.644 | -8.496 |
| 20 | -3.732 | 4.840 | -6.277 | -1.094 | 9.560 |
| 21 | -0.007 | -0.028 | -0.111 | -0.783 | -3.463 |
| 22 | 3.378 | 1.188 | 0.417 | 2.976 | 1.193 |
| 23 | 0.044 | 0.091 | 0.188 | -1.785 | -3.280 |
| 24 | -0.031 | -0.156 | -0.782 | 2.038 | 6.293 |
| 25 | 0.592 | -1.116 | 2.103 | -0.443 | -3.127 |
| 26 | -6.836 | -1.568 | -0.359 | -4.500 | -1.115 |
| 27 | 0.846 | -0.698 | 0.577 | 2.012 | -2.139 |
| SUM | 0.509 | -0.405 | 0.752 | -0.681 | -9.002 |

In Table I, $r_n$ are the radii of curvature of the lens faces and $d_n$ the lens spacing and lens thicknesses are identified above, the numerators of $n_n$ are the indices of refraction of the corresponding subscript designated lenses and the denominators or the respective Abbe number or values thereof.

The curves shown in FIG. 2 illustrate the excellent optical properties of the lens system of the specific example of the present lens system at relatively short and long focal lengths.

While there has been described and illustrated a preferred embodiment of the present invention, it is apparent that numerous alterations, omissions and additions may be made without departing from the spirit thereof.

What is claimed is:

1. A lens system comprising fifteen lenses consecutively designated as the first to the fifteenth with successive faces designated consecutively from the first to the thirtieth and possessing the following parameters:

$r_1 = -2,037.300$ | $d_1 = 3.00$ | $n_1 = 1.67270/32.2$
$r_2 = 302.678$ | $S_1 = 3.00$ |
$r_3 = 344.587$ | $d_2 = 12.90$ | $n_2 = 1.62299/58.1$
$r_4 = -1,503.486$ | $S_2 = 0.50$ |
$r_5 = 306.000$ | $d_3 = 10.00$ | $n_3 = 1.65830/53.4$
$r_6 = -5,125.200$ | $S_3 = 5.00-294.14$ |
$r_7 = -571.572$ | $d_4 = 2.50$ | $n_4 = 1.62041/60.3$
$r_8 = 143.440$ | $S_4 = 7.00$ |
$r_9 = -5,994.375$ | $d_5 = 2.50$ | $n_5 = 1.60311/60.7$
$r_{10}, r_{11} = 111.400$ | $d_6 = 8.00$ | $n_6 = 1.76182/26.5$
$r_{12} = 387.539$ | $S_6 = 270.00-5.94$ |
$r_{13} = -120.170$ | $d_7 = 2.00$ | $n_7 = 1.67000/51.7$
$r_{14}, r_{15} = 485.000$ | $d_8 = 5.00$ | $n_8 = 1.67270/32.2$
$r_{16} = -249.500$ | $S_8 = 0.50-30.98$ |
$r_{17} = 196.875$ | $d_9 = 2.00$ | $n_9 = 1.62045/38.0$
$r_{18}, r_{19} = 73.840$ | $d_{10} = 7.00$ | $n_{10} = 1.64000/60.2$
$r_{20} = -496.238$ | $S_{10} = 5.00$ |
$r_{21} = 139.650$ | $d_{11} = 9.00$ | $n_{11} = 1.60311/60.7$
$r_{22} = -340.800$ | $S_{11} = 4.00$ |
$r_{23} = -225.000$ | $d_{12} = 4.24$ | $n_{12} = 1.72825./28.3$
$r_{24} = 314.147$ | $S_{12} = 0.51$ |
$r_{25} = 66.838$ | $d_{13} = 8.00$ | $n_{13} = 1.51633/64.1$
$r_{26} = 111.400$ | $S_{13} = 51.18$ |
$r_{27} = 105.524$ | $d_{14} = 7.00$ | $n_{14} = 1.58267/46.5$
$r_{28} = 485.000$ | $S_{14} = 28.15$ |
$r_{29} = -44.200$ | $d_{15} = 2.56$ | $n_{15} = 1.51633/64.1$
$r_{30} = -98.849$ | | | wherein $r_i$ is the radius of curvature of the $i$th lens face, $S_n$ is the space between $n$th lens and the next successive lens, $d_n$ is the thickness of the $n$th lens and $n_n$ is the refraction index of the $n$th lens, said fifth and sixth lenses, said seventh and eighth lenses and said ninth and tenth lenses, being respectively cemented units, said first to third lenses defining a first group, said fourth to sixth lenses defining a second group and said seventh and eighth lenses defining a third group, said second and third lens groups being axially adjustable.

References Cited

UNITED STATES PATENTS 2,894,431 7/1959 Miles --------------- 350—217
3,038,378 6/1962 Harris et al. -------- 350—186X
3,366,437 1/1968 Moreyame et al. ----- 350—186

DAVID SCHONBERG, Primary Examiner

P. A. SACHER, Assistant Examiner

U.S. Cl. X.R.

350—217